S. J. WILSON.
BEET AND POTATO DIGGER AND ELEVATOR.
APPLICATION FILED MAR. 10, 1920.
1,414,538.
Patented May 2, 1922.
2 SHEETS—SHEET 1.
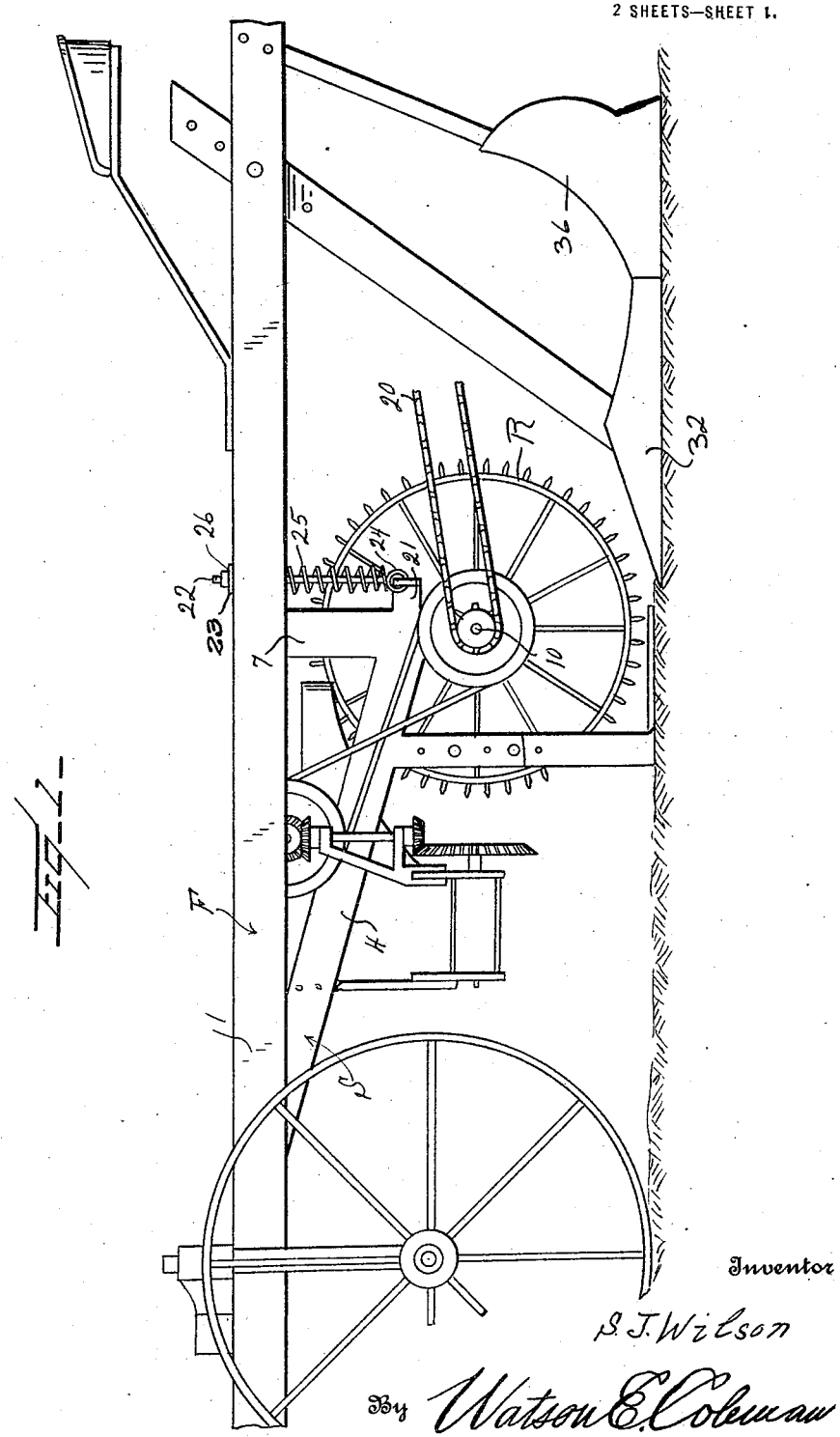
Inventor
S. J. Wilson
By Watson E. Coleman
Attorney

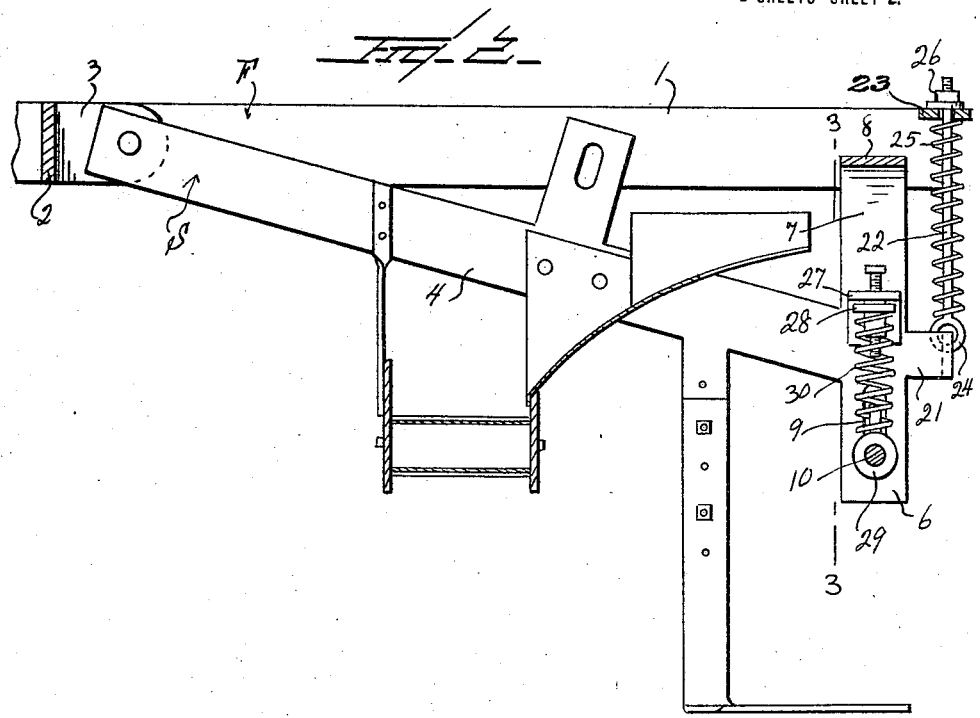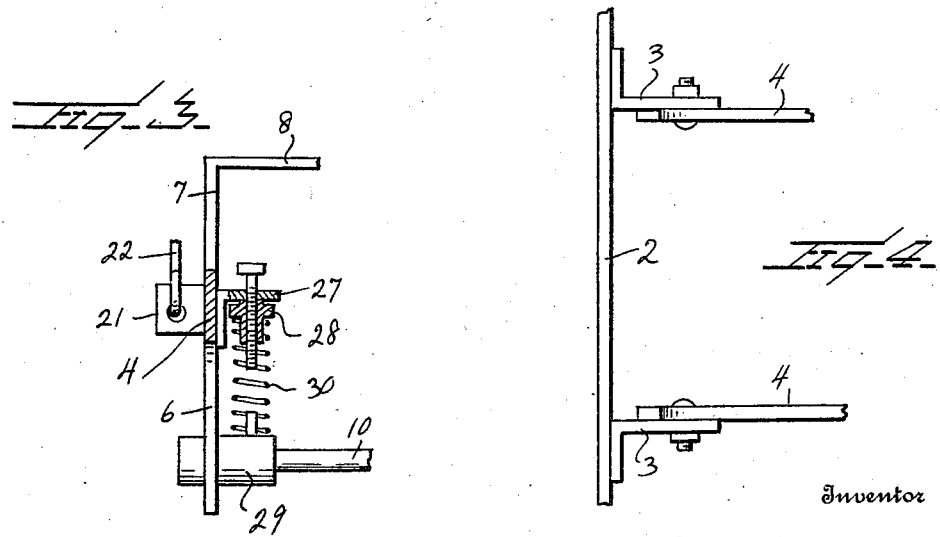

UNITED STATES PATENT OFFICE.

SAMUEL J. WILSON, OF ROBERTS, IDAHO, ASSIGNOR OF ONE-HALF TO PERRY BASINGER, OF CLYDE, IDAHO.

BEET AND POTATO DIGGER AND ELEVATOR.

1,414,538.　　　　　　Specification of Letters Patent.　　Patented May 2, 1922.

Original application filed January 11, 1919, Serial No. 270,691. Divided and this application filed March 10, 1920. Serial No. 364,802.

*To all whom it may concern:*

Be it known that I, SAMUEL J. WILSON, a citizen of the United States, residing at Roberts, in the county of Jefferson and State of Idaho, have invented certain new and useful Improvements in Beet and Potato Diggers and Elevators, the same being a division of my copending application, Serial No. 270,691, which has resulted in Patent No. 1,369,721, granted February 22, 1921, of which improvement the following is a specification, reference being had to the accompanying drawings.

This invention relates to certain improvements in beet and potato diggers and elevators, and it is an object of the invention to provide a novel and improved apparatus of this general character including a revolving lifting means and which means are supported for yielding movement in a vertical plane to compensate for tops or crowns of varying sizes.

The invention consists in the details of construction and in the combination and arrangement of the several parts of my improved apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in side elevation of an apparatus constructed in accordance with an embodiment of my invention;

Figure 2 is a view partly in elevation and partly in vertical section of the vertically swinging support frame as included in my invention as herein embodied;

Figure 3 is a fragmentary view partly in section on the line 3—3 of Figure 2 and partly in elevation, illustrating in detail a mounting for one end portion of the shaft of the rotary elevating means; and Figure 4 is a fragmentary view in top plan, illustrating the pivotal connection with the vertically swinging frame with a transverse member or beam comprised in the main frame.

As disclosed in the accompanying drawings, F denotes an elongated frame adapted to be supported in a conventional manner at its opposite end portions for travel over the ground surface and preferably by wheels. The rear portion of the frame F is also adaped to support a beet harvesting mechanism preferably of a type disclosed in my prior Patent, No. 1,285,529, issued November 19, 1918. 32 denotes digging blades and 36 indicates a directing plow or shovel as comprised in the machine as embodied in the disclosure of that patent.

The forward end portions of the side members 1 of the frame F are connected by the transversely disposed member or beam 2. This member or beam 2, at its central portion, is provided with a pair of inwardly directed spaced brackets 3 and pivotally engaged with said brackets are the forward end portions of the side members 4 of the vertically swinging frame S. The frame S is disposed downwardly and rearwardly in a direction longitudinally of the frame F and the lower or rear end portions of the side members 4 thereof are provided with substantially vertically disposed arms 6 depending therefrom and with the upstanding arms 7 in alignment with the arms 6. The upper ends of the arms 7 are connected by the transversely disposed member or beam 8.

Each of the arms 6 is provided with a longitudinally disposed slot 9 in which is slidably engaged an end portion of a shaft 10. The shaft 10 is disposed in a direction transversely of the frame F and fixed to said shaft 10 in longitudinal alignment with the digging blades 32 is a rotary lifting member R. The member R is in close proximity to the blades 32 and also in close proximity to but free of contact with the ground level. The member R is preferably of a structure disclosed in my prior application, Serial No. 270,691, filed January 11, 1919 and in my co-pending application Serial No. 364801.

An end portion of the shaft 10 has in driving connection therewith a chain 20 adapted to be driven in any desired manner by a rotating part of the beet harvesting machine (not shown). It is also to be understood that any means may be employed for rotating the shaft 10 which meets the requirements of practice.

The lower or rear ends of the side members 4 of the swinging frame S are provided with the extensions 21 and engaged with each of said extensions 21 is the lower end portion of a vertically disposed rod 22, having its upper end portion loosely directed through the transversely disposed member or beam 23 connecting the side members of the frame F. As herein disclosed, the lower end portion of the rod 22 is provided with an enlarged eye 24 which is engaged with the extension 21 and interposed between said eye 24 and the transversely disposed member or beam 23 is an expansible member 25 herein disclosed as a coil spring encircling said rod and which serves to urge downwardly the rear portion of the frame S but permits a yielding upper swinging movement thereof.

Each of the rods 22 has engaged with the upper end portion thereof and above the member or beam 23 a stop 26 herein disclosed as a nut and coacting washer and which stop serves to limit the downward movement of the rod 22 and consequently the downward swinging of the frame F. It will be self-evident that the tension of each of the members 25 will be regulated by imparting longitudinal movement to the coacting rod 22 relative to the member or beam 23 and which adjustment may be accomplished by a requisite turning movement of the stop 26.

Each of the upstanding arms 7 is provided with an inwardly directed bracket 27 having adjustably engaged therewith and positioned therebeneath a plate 28. Interposed between the plate 28 and the adjacent bearing 29 for the shaft 10 is an expansible member 30 herein disclosed as a coil spring and which serves to constantly urge the shaft 10 or more particularly the bearing 29 toward the lower end of the slot 9 in the adjacent depending arms 6 whereby the rotary lifting member R is further supported for yielding movement and independently of the swinging frame S.

From the foregoing description, it is thought to be obvious that an apparatus constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. A machine of the character described comprising a main frame, a supplemental frame pivoted at one end to the main frame, said supplemental frame having arms depending from its opposite end portion, said arms having registering slots, a shaft bearing slidable in each slot, springs yieldably connecting the bearings to the supplemental frame, and rods carried by the second mentioned end of the supplemental frame, said rods being movably connected to the main frame.

2. A machine of the character described comprising a main frame, a supplemental frame pivoted at one end to the main frame and adapted to be disposed in an inclined position, vertically disposed rods pivoted to the opposite end of the supplemental frame and slidably engaged with the main frame, springs carried by the rods for urging the supplemental frame away from the main frame, a member supported by the supplemental frame for movement relative to the supplemental frame, and springs carried by said supplemental frame for urging said member toward the ground.

In testimony whereof I hereunto affix my signature.

SAMUEL J. WILSON.